United States Patent [19]

Kukuminato

[11] 4,298,220
[45] Nov. 3, 1981

[54] PIPE JOINT

[75] Inventor: Tetsuo Kukuminato, Koshigaya, Japan

[73] Assignee: Shoketsu Kinzoku Kogyo Kabushiki Kaisha, Tokyo, Japan

[21] Appl. No.: 31,922

[22] Filed: Apr. 20, 1979

[30] Foreign Application Priority Data

Apr. 29, 1978 [JP] Japan .................................. 53-58076

[51] Int. Cl.³ ............................................. F16L 55/00
[52] U.S. Cl. ................................. 285/178; 285/238; 285/308; 285/317
[58] Field of Search ............... 285/104, 105, 308, 317, 285/340, DIG. 3, 39, 321, 178, 238, 318

[56] References Cited

U.S. PATENT DOCUMENTS 2,127,086  8/1938  McGrath .............................. 285/105
2,357,755  9/1944  Moll .................................. 285/178 X
2,503,094  4/1950  Buchanan ............................ 285/318
3,262,188  7/1966  Briegel et al. ..................... 29/450 X
3,402,947  9/1968  Lewis ................................. 285/317
3,447,821  6/1969  Bochory ............................. 285/178
3,756,634  9/1973  McGlothlin ........................ 403/361
3,909,046  9/1975  Legris ............................. 285/308 X Primary Examiner—Dave W. Arola
Attorney, Agent, or Firm—Haight, Rosfeld, & Noble

[57] ABSTRACT

A pipe joint having a radially displaceable clamp ring located within a cylindrical joint casing to circumvent a pipe passage along which a pipe is to be inserted, the clamp ring being movable between an inner concentric position and an outer eccentric position and provided with a sharp edge around the inner periphery thereof. Upon inserting a pipe into the joint casing, the clamp ring is pushed into the inner concentric position to allow passage of the pipe and, as soon as the pipe is fully inserted into a connected position, the clamp ring is pressed toward the outer eccentric position by a spring, clamping the pipe securely in the connected position by the sharp edge on the inner periphery of the ring.

11 Claims, 9 Drawing Figures

PIPE JOINT

BACKGROUND OF THE INVENTION (1) Field of the Invention

This invention relates to pipe joints, and more particularly to a joint for connecting pipes of synthetic resin material such as nylon or of a soft metal such as copper which serve as a conduit for fluids.

(2) Description of the Prior Art

There has been known in the art a push-in type pipe joint which can connect a pipe with a suitable strength simply by inserting one end of the pipe axially into a bore of a joint casing which, for instance, accommodates an annular plate or a ring tiltably for locking engagement with the inserted end of the pipe. With this type of pipe joint, the pipe is easily inserted into the joint by guiding the connecting end of the pipe concentrically with the opening of the annular plate or ring which, once the pipe is inserted, is tilted relative to the axis of the pipe by the action of a spring to hold the circumference of the pipe clampingly with its inner peripheral portions. The annular plate or ring is tilted in such a direction that its inner peripheral portions will bite on the circomference of the pipe with a greater force if the pipe is pulled outward or in a disconnecting direction, securely holding the pipe in the connected position.

Such pipe joints thus far have been required to employ a tilting plate or ring which has an inside diameter sensibly larger than the outside diameter of the pipe in order to facilitate pipe insertion through the tiltable plate or ring. In addition, the tiltable plate or ring is required to have a thickness greater than a certain value in order to ensure secure biting action of the inner peripheral edge portions of the disc or ring. Consequently, the disc or ring has to be tilted through a relatively large angle to perform the above-mentioned clamping function. These requirements are very disadvantageous to the compactness of the joint. Any pipe joint is desired to have a compact construction since otherwise it would unduly bulge out when mounted to connect a pipe to hydraulic equipments such as valves and piston-cylinders. A bulky joint is susceptible to damages by hitting upon nearby structures and could be an obstacle to operations or piping work in a narrow space. With regard to the compactness, the above-mentioned conventional pipe joint has large limitations inherent to its construction.

In order to detach the pipe from the conventional joint mentioned above, a release pin which is associated with the annular plate or ring is operated to return the tilted plate or ring into the upright coaxial position, setting the pipe loose. However, this procedure is troublesome and sometimes difficult since in most cases the pipe joints employ very small release pins to cope with the outside diameters of the pipes which are generally 18 mm or less, along the circumference of the pipe.

The conventional pipe joint has another drawback in that it is relatively complicated in construction and presents problems during automatic mechanical assembling process, including the problem of biased load on the spring.

It is therefore an object of the present invention to provide a pipe joint which permits of easy connection and disconnection of a pipe without using any tool.

It is another object of the present invention to provide a pipe joint employing a radially displaceable clamp ring which is located in the pipe passage in the joint casing and provided with a sharp edge around the inner periphery thereof to clampingly bite on the circumference of a pipe when the clamp ring is pressed into an eccentric position after pipe insertion thereby automatically holding the pipe in the connected position.

It is still another object of the present invention to provide a pipe joint employing a release ring which is slidably fitted at the entrance of the pipe passage and which is easily manipulatable from outside to push the clamp ring into a concentric position thereby releasing the pipe from the clamping action of the sharp edge of the clamp ring to allow extraction of the pipe without using any tool.

It is a further object of the present invention to provide a pipe joint in which the biting action of the sharp edge becomes stronger by displacement of the clamp ring when the joint is subject to a force which tends to extract the pipe therefrom, thereby producing a greater resistance to such extracting force.

It is a further object of the present invention to provide a pipe joint of a simple and compact construction which can securely hold a pipe in the connected position simply through eccentric displacement of a clamp ring.

It is still another object of the present invention to provide a pipe joint constituted by component parts which are easily obtainable by simple operations on a press or a lathe to allow mass production at low costs.

It is a further object of the present invention to provide a pipe joint which can cope with pipes with a larger tolerance in outer diameter, as compared with the conventional counterparts.

SUMMARY OF THE INVENTION

According to the present invention, the foregoing objects are achieved by a pipe joint which comprises: a casing having a hollow cylindrical pipe receiving portion defining therein a pipe passage axially through the entire length thereof; a clamp ring located within the pipe receiving portion to circumvent the pipe passage and radially displaceable by movement along the inner periphery of the pipe receiving portion, the clamp ring having a sharp edge around the inner periphery thereof to bite on the circumference of a pipe inserted into the pipe passage; a tapered surface provided at least on the inner periphery of the pipe receiving portion or on the outer periphery of the clamp ring to displace the clamp ring slidingly between an outer eccentric position and an inner concentric position relative to the axis of the pipe passage; a spring provided within the casing to urge the clamp ring toward the outer eccentric position; and a release ring slidably and concentrically fitted into the entrance of the pipe receiving portion and manipulatable from outside to push the clamp ring toward the inner concentric position.

With a pipe joint of this construction, upon inserting a pipe, the clamp ring is pushed into an inner concentric position against the biasing force of the spring to allow passage therethrough of the pipe. As soon as the pipe is fully inserted into a connected position, the clamp ring is pressed toward the outer eccentric position by the action of the spring clamping the pipe in the connected position with part of the sharp edge on the inner periphery thereof. The clamping force is increased all the more in the event a force which tends to extract the pipe is applied thereto, thereby securely holding the pipe in the connected position.

In order to disconnect the pipe from the joint, the release ring is pushed into the joint casing whereupon the clamp ring is moved into the inner concentric position, releasing the pipe from the clamping action of its sharp edge to allow extraction of the pipe.

BRIEF DESCRIPTION OF THE DRAWINGS

The above and other objects, features and advantages of the present invention will become apparent from the following description and appended claims, taken in conjunction with the accompanying drawings which show by way of example preferred embodiments of the present invention and in which:

DESCRIPTION OF PREFERRED EMBODIMENTS

Figure 1:
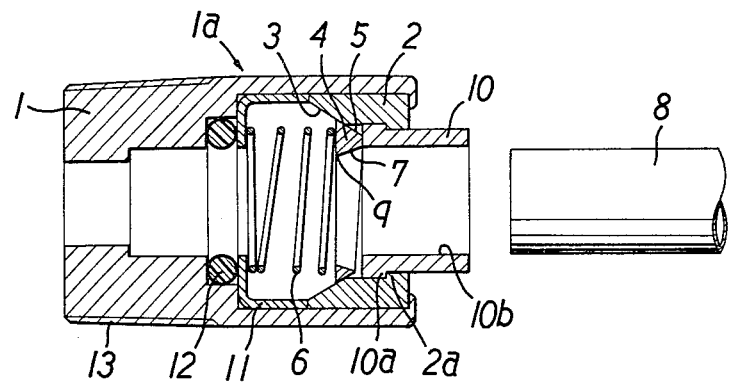
FIG. 1 is a longitudinal section of a pipe joint according to the present invention, showing same in free state.

Referring to FIG. 1, designated at 1 is a hollow joint casing substantially of a cylindrical shape which has a sleeve 2 fitted in securely at the entrance of a cylindrical pipe receiving portion 1a. The sleeve 2 is tapered toward its inner end to have an inwardly diversing inner periphery as indicated at 3. In engagement with the tapered surface 3 of the sleeve 2 is a complementarily tapered surface 5 of a clamp ring 4 of a smaller diameter which is urged toward the outer end of the pipe receiving portion 1a by a coil spring 6 and radially displaceable by movement along the tapered surface 3. The clamp ring 4 has a counter tapered surface 7 on its inner periphery which is disposed eccentrically with the axis of the pipe to be received in the pipe receiving portion 1a, forming at the inner end a sharp edge 9 which will clampingly bite on the circumference of the pipe 8 as will be described hereinlater.

One end portion of a release ring 10 with an annular flange 10a is slidably fitted concentrically in the sleeve 2 on the outer side of the clamp ring 4, the other end being projected out of the casing 1 and manipulatable to push the clamp ring 4 from outside. The release ring 10 is prevented from coming off the sleeve 4 by the annular flange 10a at the inner end of the release ring which is stopped by abutment against an inner flange 2a at the outer end of the sleeve 2.

If desired, the sleeve 2 may be formed integrally with pipe receiving portion 1a. In FIG. 1, the reference numeral 11 denotes a retainer, 12 a sealing O-ring and 13 an external thread for connection to an equipment on which the pipe joint is to be mounted.

For connecting the pipe 8 with the joint shown above, it is inserted from an opening 10b of the release ring 10 to abut against the tapered surface on the inner periphery of the clamp ring 4. The abutment of the pipe 8 against the clamp ring 4 takes place since the counter taper 7 on the latter is disposed eccentrically relative to the axis of the pipe receiving portion 1a although the outer periphery of the clamp ring 4 is normally engaged by the tapered surface 3 on the inner periphery of the sleeve 2 in concentrical relation with the axis of the pipe receiving portion 1a. Under these circumstances, if the pipe is further pushed in, the clamp ring 4 is radially displaced during its inward movement along the tapered surface 3, tending to bring the opening defined by the counter taper 7 into concentric relation with the pipe 8. While the clamp ring 4 is moved into a concentric position, the pipe 8 is passed through the clamp ring 4 into the position shown in FIG. 2.

Figure 2:
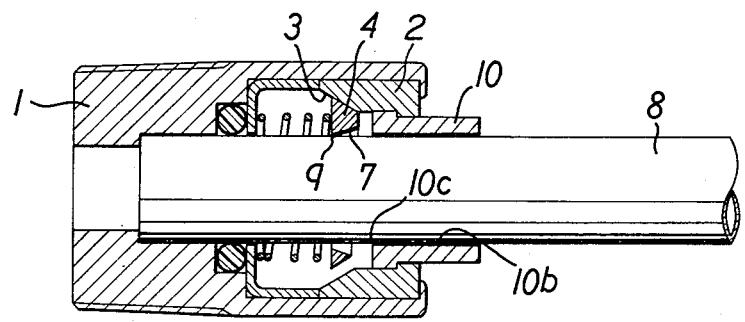
FIG. 2 is a view similar to FIG. 1 but showing the joint as connecting a pipe.

When the pipe 8 is fully inserted into the position of FIG. 2, the clamp ring 4 is pressed against the tapered surface 3 of the sleeve 2 by the action of the spring and displaced along the tapered surface 3, tending to return to the initial position in which the outer periphery of the clamp ring 4 is disposed concentrically with the joint casing 1. As a result, the sharp edge 9 on the inner periphery of the clamp ring 4 is pressed against the circumference of the pipe, clamping the latter in the connected position. In this instance, it is also possible to make arrangements to clamp the pipe 8 in the connected position by a sharp edge which is provided along the edges of the flanged inner end 10c of the release ring 10.

In this state, if a force which tends to extract the pipe is applied, the displacement of the clamp ring 4 is encouraged all the more, causing the sharp edge 9 to bite on the pipe 8 with greater force to produce a greater resistance to such force.

In order to extract the pipe 8, the release ring 10 is pushed in to move inward the clamp ring 4 which then becomes radially displaceable to a certain extent according to the width of the gap between the outer periphery of the clamp ring 4 and the tapered surface 3 of the sleeve 2, as a result the sharp edge 9 setting the pipe 8 loose to allow extraction thereof.

Figure 3:
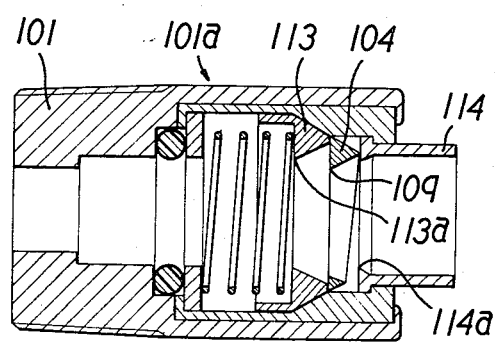
FIG. 3 is a longitudinal section of a modification of the pipe joint of FIG. 1, having an auxiliary clamp ring mounted on the joint casing.

In FIG. 3 which shows a modification of the pipe joint of FIGS. 1 and 2, a pipe receiving portion 101a of a joint casing 101 has auxiliary ring 113 and a release ring 114 which are slidably fitted in the pipe receiving portion 101a in concentrical relation therewith and provided with sharp edges 113a and 114a along the respective inner peripheries thereof. A radially displaceable clamp ring 104 is interposed between the just-mentioned two rings 113 and 114.

Therefore, in this modification, the pipe is clamped in the connected position by the biting actions of the sharp edges 109, 113a and 114a on the inner peripheries of the respective rings 104, 113 and 114.

Figure 4:
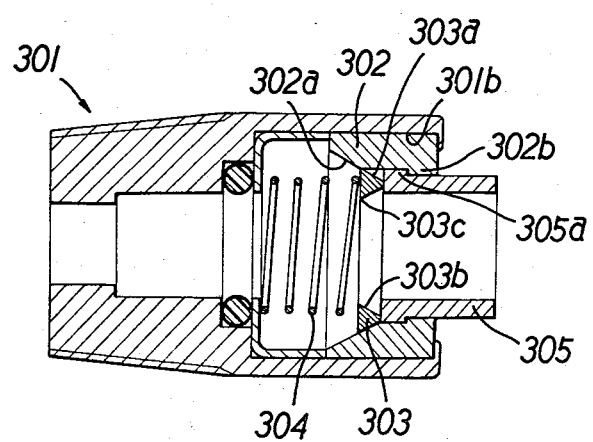
FIG. 4 is a longitudinal section of a pipe joint which constitute another embodiment of the present invention.

FIG. 4 illustrates another embodiment of the invention, wherein a sleeve 302 which is fitted in a cylindrical pipe receiving portion of a joint casing 301 is provided with a tapered surface 302a on its inner periphery eccentrically with the axis of the joint casing 301. Fitted slidably within the sleeve 302 is a clamp ring 303 which is provided on its outer periphery with a tapered surface 303a complementary to the tapered surface 302a of the sleeve 302 and on its inner periphery with a conncentric counter-tapered surface 303b, forming a sharp edge 303c therearound. The clamp ring 303 is urged toward the mouth end 301b of the casing by the action of a spring 304. One end of a release ring 305 with an annular outer flange 305a is slidably fitted in the sleeve 302 and stopped therein by an annular inner flange 302b at the outer end of the sleeve 302.

Figure 5:
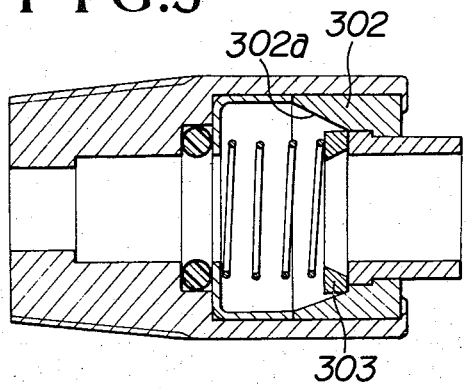
FIG. 5 is a longitudinal section of a modification of the pipe joint of FIG. 4.

The clamp ring 303 is not necessarily required to have a tapered surface on the outer periphery thereof, which may be formed in any other arbitrary shape as long as it has a contacting surface which is slidable along the tapered surface 302a on the sleeve 302 as shown in FIG. 5.

Figure 6:
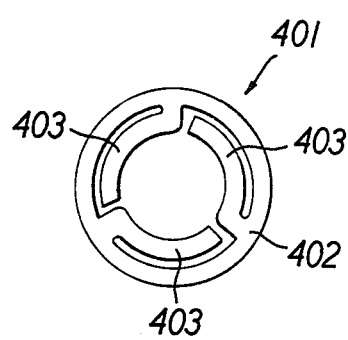
FIG. 6 is a front elevation of a leaf spring employed in the pipe joint according to the present invention.
Figure 7:
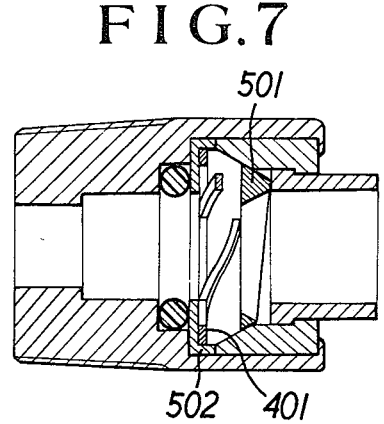
FIG. 7 is a view similar to FIG. 1 in which the leaf spring of FIG. 6 is used instead of a coil spring.
Figure 8:
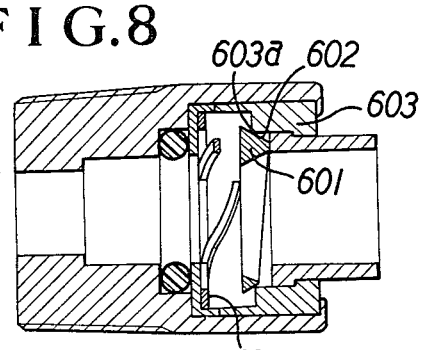
FIG. 8 is a longitudinal section of a modification of the pipe joint of FIG. 7.

Referring now to FIGS. 6 to 8, there are shown embodiments of the invention which employ an annular leaf spring 401 instead of the coil spring of the foregoing embodiments. The leaf spring 401 has along its inner periphery a number of tongues 403 which are lanced out of a circular web 302 as shown in FIG. 6. FIG. 7 shows the annular leaf spring 401 as mounted in position within the joint casing, from which it will be understood that the use of the annular spring 401 allows to reduce the distance between the clamp ring 501 and the retainer 502.

The pipe joint of FIG. 8 is a modification of the embodiment of FIG. 7, in which the annular leaf spring 401 is likewise mounted within the joint casing but the tapered surface 602 on the outer periphery of the clamp ring 601 is contacted with a stepped portion 603a on the inner periphery of the sleeve 603.

Figure 9:
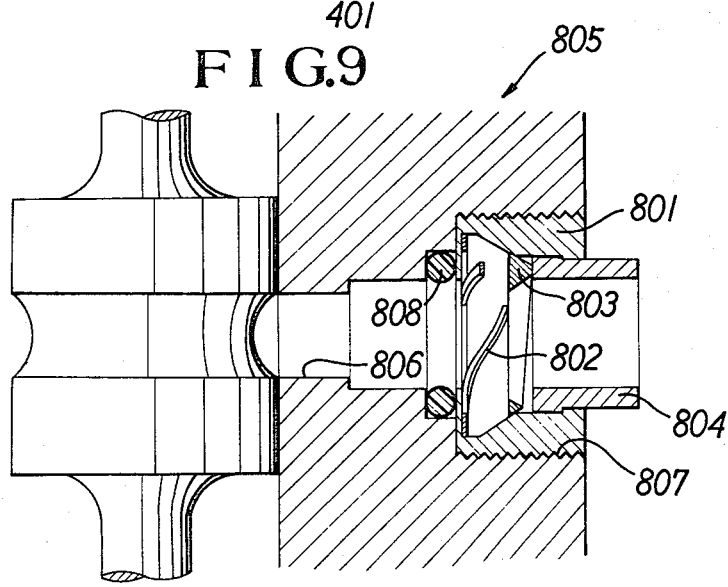
FIG. 9 is a fragmentary section showing the pipe joint of the invention which is installed within a housing of a valve.

In the embodiment of FIG. 9, the joint casing is provided within a valve housing 805 in direct communication with a fluid port thereof. Within a cylindrical casing 801 which is open at opposite ends, a spring 802, a clamp ring 803 and a release ring 804 are arranged in a manner similar to the embodiment of FIG. 7. The casing 801 is embedded through a seal member 808 in a bore 807 which is provided in the valve housing immediately on the outer side of a valve portion 806 to which a pipe is to be connected. The casing 801 is fixed in the bore 807 by threaded engagement therewith or by other suitable means. With this arrangement, substantially the whole joint assembly is implanted within the valve housing without projecting outside, so that the pipe can be connected directly to the valve, extremely facilitating the pipe connections or disconnections for altering the fluid passages.

Although the embodiments of the present invention has been described in relation with a valve, it is apparent that the pipe joint of the invention can be likewise applied to fluid ports of hydraulic cylinders or of other equipments.

What is claimed is:

1. A pipe joint comprising:
   (a) a casing having a pipe receiving portion defining a passage for axially receiving a leading end of a pipe, the casing defining an entrance;
   (b) a rigid clamp ring mounted within the casing transversally of the passage, the clamp ring having an inwardly tapered inner peripheral surface facing the entrance and terminating in a sharp inner edge defining an opening in the clamp ring;
   (c) the clamp ring having an outer peripheral surface in sliding engagement with a contacting portion on the inner periphery of the pipe receiving portion for guiding the clamp ring between a first position, where the opening is eccentric to the axis of the passage and the tapered inner peripheral surface obstructs the passage, and a second position, where the opening is concentric to the axis of the passage and the tapered inner peripheral surface is removed from the passage,
   (d) a spring in the casing urging the clamp ring into its first, eccentric position;
   (e) the clamp ring being responsive to insertion of a pipe bend through the casing entrance along the passage and against the tapered inner peripheral surface, to be displaced radially and axially from the first, eccentric position to the second, concentric position to facilitate movement of the pipe, the spring continuously urging the clamp ring such that its sharp innr edge engages the periphery of the inserted pipe; and
   (f) a release ring mounted in the casing entrance concentrically of the passage and extending between the interior and exterior of the casing, the release ring being moveable against the clamp ring to displace it out of engagement with the pipe and facilitate removal of the pipe from the casing.

2. A pipe joint according to claim 1, wherein the inner periphery of said clamp ring is positioned eccentrically to the outer peripheral surface of the clamp ring.

3. A pipe joint according to claim 1, wherein an eccentric tapered surface is provided around the inner periphery of said pipe receiving portion.

4. A pipe joint according to claim 1, wherein said spring is a coil spring.

5. A pipe joint according to claim 1, wherein said spring is an annular leaf spring having a number of lanced tongues around the inner periphery thereof.

6. A pipe joint according to claim 1, further comprising an auxiliary clamp ring provided within said casing concentrically with the axis of said pipe passage.

7. The pipe joint of claim 1 wherein the clamped ring's outer peripheral surface is tapered.

8. The pipe joint of claim 1 wherein the contacting portion is tapered.

9. A pipe joint according to claim 1, further comprising a retaining means for preventing said release ring from coming off said pipe receiving portion of said casing.

10. A pipe joint according to claim 9, wherein said retaining means comprises an annular outer flange circumferentially disposed in the entrance of the pipe receiving portion.

11. A pipe joint according to claim 9, wherein said retaining means comprises an inwardly diverging tapered surface of the inner periphery of said the pipe receiving portion and a complimentarily tapered surface on the outer periphery of said auxiliary clamp ring.

* * * * *